R. A. PYKE.
LOCKING DEVICE FOR THE STEERING WHEELS OF MOTOR VEHICLES.
APPLICATION FILED JAN. 7, 1920.
1,385,469.
Patented July 26, 1921.
2 SHEETS—SHEET 1.
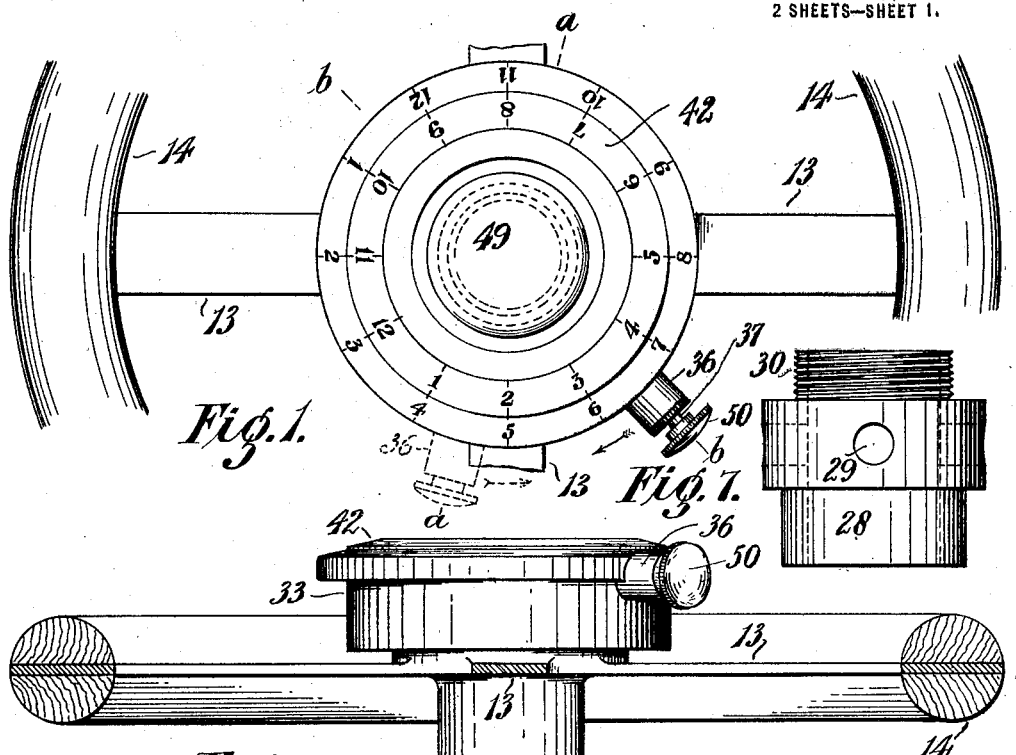
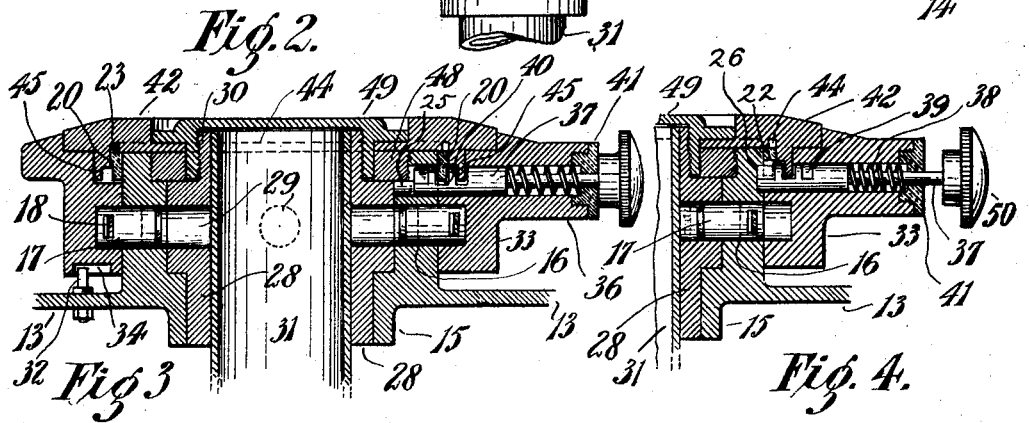
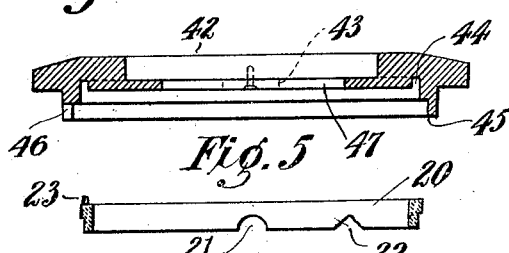
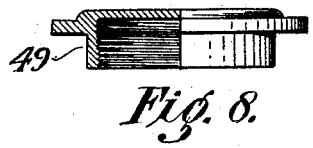
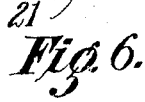
INVENTOR
Robert A. Pyke
BY Wm Wallace White
ATT'Y.

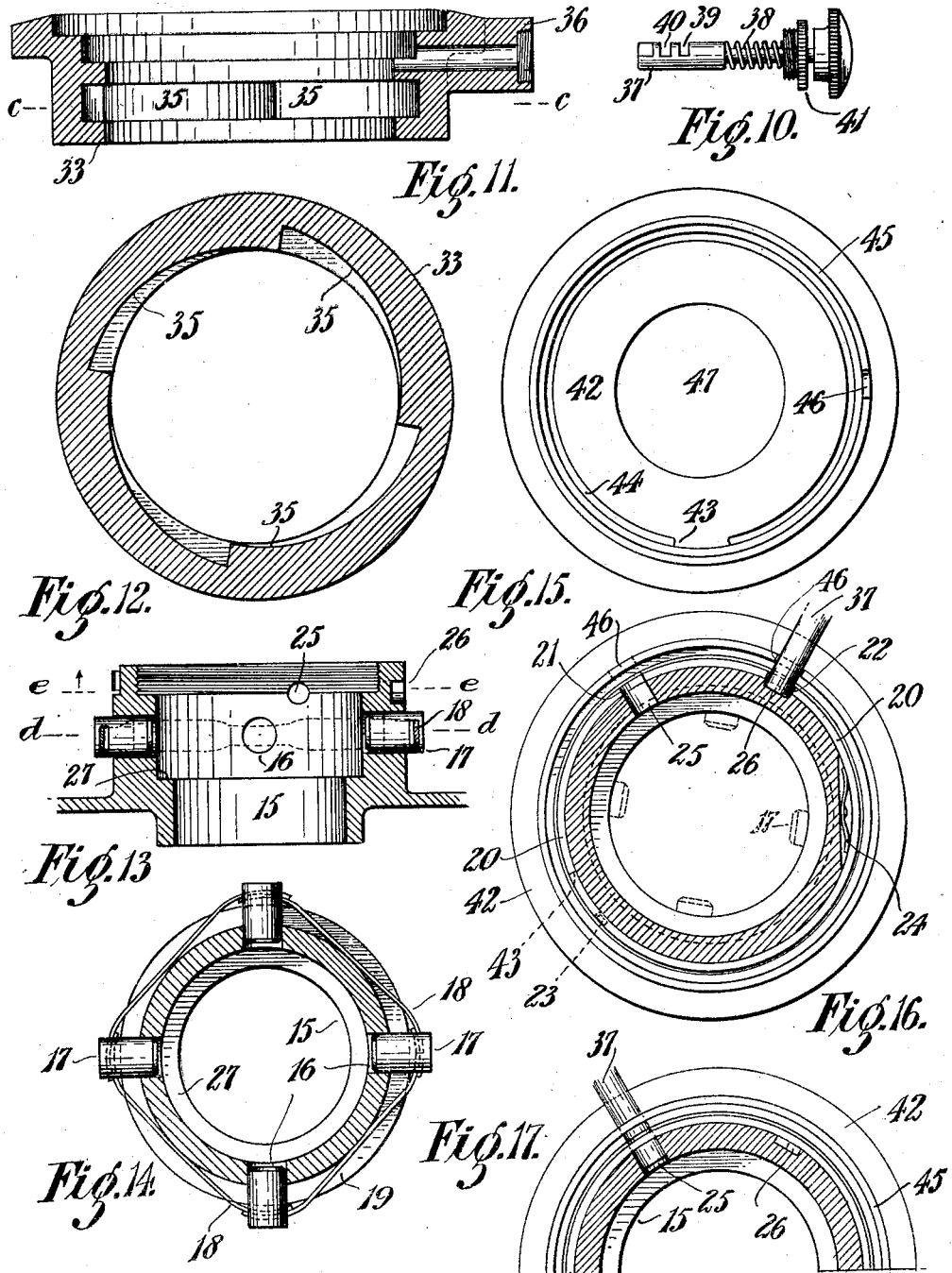

UNITED STATES PATENT OFFICE.

ROBERT ARCHIBALD PYKE, OF COLAC, STATE OF VICTORIA, AUSTRALIA.

LOCKING DEVICE FOR THE STEERING-WHEELS OF MOTOR-VEHICLES.

1,385,469.  Specification of Letters Patent.  Patented July 26, 1921.

Application filed January 7, 1920. Serial No. 349,963.

*To all whom it may concern:*

Be it known that I, ROBERT ARCHIBALD PYKE, a British subject, residing at Murray street, Colac, in the State of Victoria, Commonwealth of Australia, have invented new and useful Improvements in Locking Devices for the Steering-Wheels of Motor-Vehicles, of which the following is a specification.

This invention relates to an improved locking device for the steering wheels of motor vehicles, whereby the steering mechanism may be temporarily rendered inoperative, so that the vehicle may be left unattended without fear of its being stolen or driven away in the driver's absence, the main object of the invention being to provide a secret combination locking means which will enable the driver to effectively lock the steering mechanism in inoperative position as well as in operative position, and which locking means involves certain manipulations of a rotatable member, which manipulations the operator must be familiar with in order to return the locking mechanism into operative position.

A further object of the invention is to provide a pair of members rotatable relatively to each other and each bearing a series of numerals or other characters, certain of which must be brought into registering position in order to render the steering mechanism operative.

With the foregoing and other objects in view, which will appear as the description proceeds, the invention consists in the novel features of construction and combination of parts which will be more fully described hereinafter and particularly pointed out in the claims.

In the drawings accompanying and forming part of this specification,

Figure 1 is a plan view, partly broken away, of the steering wheel of a motor vehicle, illustrating one embodiment of the present invention applied thereto;

Fig. 2 is a side elevation, partly in section, of the steering wheel shown in Fig. 1;

Fig. 3 is a sectional view taken approximately on the line *a—a* of Fig. 1, and illustrating the correct relative positions of the parts when the steering wheel is in inoperative position;

Fig. 4 is a partial transverse sectional view taken approximately on the line *b—b* of Fig. 1, illustrating the positions of the parts when the steering wheel is in operative position;

Figs. 5, 6, 8 and 9 are detail sectional side views respectively of a rotatable cap and coöperating members forming part of the improved locking device;

Fig. 7 is a side elevation of a core also forming part of the present invention;

Fig. 10 is a side view of the locking plunger or key;

Fig. 11 is a vertical section of a cam cup forming a part of the improved locking device;

Fig. 12 is a horizontal section taken approximately on the line *c—c* of Fig. 11;

Fig. 13 is a sectional elevation of a barrel adapted to coöperate with said cam cup;

Fig. 14 is horizontal section taken approximately on the line *d—d* of Fig. 13;

Fig. 15 is a bottom plan view of the rotatable cap shown in Fig. 5; and

Figs. 16 and 17 are diagrammatic plan views, partly in section, illustrating the relative position of the locking bolt holes and recesses hereinafter described, when the steering wheel is in operative and inoperative positions respectively, Fig. 16 being taken approximately on the line *e—e* of Fig. 13, while Fig. 17 illustrates only one half of the members shown in Fig. 16.

The same characters of reference designate the same parts in the different figures of the drawings.

Referring to the drawings, 31 designates the usual steering post or rod of a motor vehicle. Keyed to the post 31 is a tubular member 28 (see Figs. 3, 4 and 7) which I have termed a "core," and which member is of greater external diameter at its central portion than at its ends, thereby forming a shoulder at each side of said central portion. This core is provided in its central enlarged portion with a plurality of radial openings 29 for a purpose to be hereinafter described, and is externally threaded at one side of said enlarged central portion so as to form a neck 30.

15 designates a tubular member which I have termed herein a "barrel," the bore of which is of three different diameters, two of which are adapted to fit respectively the enlarged portion of the core and the unthreaded portion thereof adjacent to said enlarged portion, whereby a shoulder 27 within the barrel 15 forms a seat for the lower exterior shoulder of the core. The portion of the bore of the barrel 15 having the largest diameter is interiorly threaded and of such a depth as to form a shoulder the upper surface of which is in the same horizontal plane as the surface of the upper shoulder formed by the enlarged portion of the core 28 (see Figs. 3, 4 and 13). The barrel 15 is also provided near its upper end, with a radially extending opening 25 and a radial recess 26 for coöperation with a locking plunger to be hereinafter described, said opening and recess being shown both clearly in Figs. 13, 16 and 17. A plurality of radial arms 13 are formed integral with the barrel 15, and to the outer end of the arm is secured the usual steering wheel or handle 14. The barrel 15 is also provided with a plurality of radial openings 16 so located as to register with the openings 29 in the core 28, and within each of the openings 16 is located a slidable pin 17, the barrel 15 being provided with an annular recess or groove 19 (see Fig. 14) for the reception of spring members 18, the ends of which are secured in slots in the outer end of the pin 17, the tension of the springs normally maintaining the pin projected outwardly from the openings 16. For maintaining the core and barrel in position for rotation relative to each other, I have provided an exteriorly threaded washer 48, the thread of which engages the interior thread of the barrel, the thickness of the washer being such as to bridge the shoulders of the barrel and core, as shown in Figs. 3 and 4.

Mounted for rotation on the barrel 15 is a member 33 hereinafter called a "cam cup" having formed in its circumferential wall, a plurality of cam recesses or grooves 35, shown most clearly in Fig. 12, adapted to operate the pins 17 against the tension of the springs 18. Above said grooves, the bore of the member 33 is of two different diameters, forming a pair of stepped annular recesses (see Figs. 3 and 11), the bottom of the upper one of which is in the same horizontal plane as the extreme upper end of the barrel 15, and the lower one of which forms a space between the outer surface of said barrel and the circumferential wall of the cam cup 33 and within which space is located an annular locking ring 20, the bore of which is adapted to fit around the barrel 15, the barrel being provided with an external tangential recess in which is secured a spring 24 (see Fig. 16) for maintaining a proper amount of friction between the ring and barrel. The ring 20 is provided in its lower edge with a semi-circular recess 21 and an approximately V-shaped notch 22, and at its upper edge with a projecting pin or lug 23, for purposes to be hereinafter described.

For coöperation with the mechanism above set forth, a rotatable cap 42 is provided, of the form best shown in Figs. 3, 5 and 15. This cap is beveled at its upper outer edge and is provided with a central opening 47 and an annular recess in its upper side of larger diameter than said opening, thereby forming an inwardly extending flange. The cap is provided at its underside with a depending flange 45, the inner wall of which is stepped as shown clearly in Figs. 5 and 15. The beveled portion of the cap 42 is of such a diameter as to fit within the uppermost recess of the member 33, while the depending flange 45 fits within the recess between the wall of said member 33 and the locking ring 20, said ring being provided with an exterior annular shoulder abutting against the wall of the recess of smaller diameter at the underside of the cap 42, whereby an annular space is left open between the outer lower surface of the ring and the inner lower side of the depending flange 45, as shown at the left-hand side of Fig. 3. The cap 42 is also provided with a groove 44 in its lower face extending almost entirely therearound for the reception of the pin 23 carried by the ring 20, a stop or block 43 being left in the groove for coöperation with said pin at the proper time. The depending flange 45 is provided with a radial opening 46 adapted to register with the opening 25 and the recess 26 of the barrel at different times. For maintaining all of the parts in position for rotation relatively to the core 28, a cap 49, shown in detail in Fig. 8, is provided, said cap having an interiorly threaded depending flange adapted to engage the threaded end 30 of the core 28, and the outer surface of which flange engages the inner wall of the washer 48, said cap being also provided with a radial flange adapted to rest on the inwardly extending flange of the member 42 as shown in Fig. 3, whereby all of the parts are retained in position on the steering post, while the members 42, 33 and 15, together with the locking ring 20 and the washer 48, are rotatable around the core 28.

A plunger bolt or key 37, controlled by a spring 38, is housed within a socket arm 36 extending radially from the cam cup 33, said plunger being retained in said arm by means of a gland 41 threaded into the end of the socket. A pair of notches or kerfs 39 and 40 are formed in one side of the plunger 37 (see Fig. 10) and are adapted to coöperate with the flange 45 of the rotatable cap 42 and with the body of the ring 20 for locking the parts in operative or inoperative position. The bolt or plunger key may be provided, if desired, with any suitable means for preventing rotation thereof, and, as shown herein, is provided with a head or button 50 for manually operating the key.

One of the steering arms 13 is provided with an upstanding pin or stud 32, which projects into a recess 34 formed in the underside of the cam cup 33, the walls of which recess form stops engaging said stud thereby to limit the relative rotary movement between the barrel 15 and the cam cup 33, the recess being of approximately the same length as the distance between the centers of the opening 25 and the recess 26 in the barrel.

In the operative position of the steering wheel, shown in Fig. 4, the cam pins or bolts 17 have been forced inwardly by the cam groove 35 of the cam cup so that they engage the opening 29 in the core 28, thereby locking the core for rotation with the barrel 15. In this operative position, the end of the plunger 37 is in the recess 26 in the outer surface of the barrel 15, while the groove 40 of the plunger is engaged by the depending flange 45 of the cap 42 and the web forming the wall of the groove 40 nearest the end of the plunger is in the space between the flange 45 and the ring 20, the reduced end of the plunger then occupying the V-shaped niche 22 in the ring, which niche is then in alinement with the recess 26 in the wall of the barrel. With the parts in this relative position, the plunger cannot be withdrawn from the recess 26, so that the steering mechanism is locked in operative position. It will be obvious, of course, that the direction of rotation of the cap 42 may be changed according to whether the stop 43 is at one side or the other of the pin 23 of the ring 20.

In order to render the steering wheel inoperative the cap 42 must first be rotated to bring the opening 46 in its depending flange 45 again into alinement with the recess 26 in the barrel so as to permit the webs of the plunger to pass the flange 45, whereupon the plunger is withdrawn from the recess 26 of the barrel and from the niche 22 of the ring 20. The cam cup can then be rotated relatively to the barrel until the cam grooves 35 have permitted the pin 17 to recede under the action of their springs 18 from engagement with the opening 29 in the core 28, which rotation also brings the opening 25 in the barrel into alinement with the plunger socket 36. The plunger 37 is now still further withdrawn to permit rotation of the cap 42 until its stop 43 engages the pin 23 of the ring 20. This brings the opening 21 of the ring into alinement with the opening 46 in the flange 45 of the cap, and the cap and ring are rotated together until these openings are brought into alinement with the opening 25 in the barrel and with the plunger socket, whereupon the plunger, under the action of its spring 38, will project into the opening 25 in the barrel and thereby lock the same against rotation relatively to the cam cup. The cap 42 may then be partially rotated to carry the opening 46 in its flange 45 and the opening 21 in the ring out of alinement with the opening 25, so that the flange 45 now occupies the kerf 39 of the plunger, while the body of the ring 20 occupies the other kerf 40, thereby preventing withdrawal of the plunger and locking the steering mechanism in inoperative position.

The beveled upper surfaces of the cap 42 and the cam cup 33 may be provided with any desired characters which must be brought into register with each other to indicate to the operator the proper relative position of the cap and cam cup to permit operation of the plunger 37 for locking the parts in operative and inoperative positions. In the present instance, the cam cup and cap are provided each with a series of numerals, and it will readily be seen that these numerals may be arranged in such relative positions that when a certain pair are in alinement, the opening 46 in the flange 45 and the opening 21 in the ring 20 are also in alinement with the opening 25 in the barrel to permit the plunger key to be withdrawn, and some other combination of the numerals may be arranged for indicating when the opening 46 and the niche 22 in the ring are in alinement with the recess 26 in the barrel.

From the foregoing description, it will be obvious that it would be extremely difficult, and practically impossible, for any person not acquainted with the necessary adjustment to bring the ring and flange openings opposite the openings or the recess in the barrel. It will be understood, of course, that I do not limit my invention to the use of any particular number of pins and corresponding apertures in the barrel and core. I have found, however, that four cam pins give satisfactory results.

Having thus described my invention, what I claim is:

1. The combination with the steering wheel and post of a motor vehicle, of a core secured to said post for rotation therewith and provided with a plurality of radial openings, a barrel secured to said wheel and encircling said core for rotation relatively thereto, slidable members carried by said barrel and adapted to engage the openings in the core thereby to secure the barrel and core for rotation together, means normally holding said members out of engagement with said openings, a cam cup mounted for rotation on said barrel and having a plurality of cams for operating said slidable members into engagement with said openings, and means for locking said barrel with its slidable members both in and out of engagement with the openings.

2. The combination with the steering wheel and post of a motor vehicle, of a core secured on said post for rotation therewith, a barrel secured to said wheel and encircling said core for rotation relatively thereto, means carried by said barrel for engaging said core thereby to permit rotation of the barrel and core together, a member mounted on said barrel for rotation relatively thereto, means carried by said member for operating said core engaging means during its rotation relative to the barrel, means for limiting the rotation of said member relative to said barrel, and means for locking said member and barrel together at either limit of relative rotation.

3. The combination with the steering wheel and post of a motor vehicle, of a core secured to said post for rotation therewith, a barrel secured to said wheel and encircling said core for rotation relatively thereto, means carried by said barrel for engaging said core thereby to permit rotation of the barrel and core together, a member mounted on said barrel for rotation relatively thereto, means carried by said member for operating said core engaging means during its rotation relative to the barrel, and means for locking said member and barrel together, said means comprising a spring-pressed key carried by said member and adapted to enter an opening in said barrel.

4. The combination with the steering wheel and post of a motor vehicle, of a core secured to said post for rotation therewith, a barrel secured to said wheel and encircling said core for rotation relatively thereto, means carried by said barrel for engaging said core thereby to permit rotation of the barrel and core together, a member mounted on said barrel for rotation relatively thereto, means carried by said member for operating said core engaging means during its rotation relative to the barrel, means for locking said member and barrel together, said means comprising a spring-pressed key carried by said member and adapted to enter an opening in said barrel, and means for preventing withdrawal of said key from said opening.

5. The combination with the steering wheel and post of a motor vehicle, of a core secured on said post for rotation therewith, a barrel secured to said wheel and encircling said core for rotation relatively thereto, means carried by said barrel for engaging said core thereby to permit rotation of the barrel and core together, a member mounted on said barrel for rotation relatively thereto, means carried by said member for operating said core engaging means during its rotation relative to the barrel, means for limiting the rotation of said member relative to said barrel, means for locking said member and barrel together at either limit of relative rotation, said means comprising a slotted spring-pressed key carried by said member and adapted to enter an opening in said barrel, and a rotatable cap having a depending flange extending into one of the slots of said key for preventing the withdrawal thereof.

6. The combination with the steering wheel and post of a motor vehicle, of a core secured on said post for rotation therewith, a barrel secured to said wheel and encircling said core for rotation relatively thereto, means carried by said barrel for engaging said core thereby to permit rotation of the barrel and core together, a member mounted on said barrel for rotation relatively thereto, means carried by said member for operating said core engaging means during its rotation relative to the barrel, means for limiting the rotation of said member relative to said barrel, means for locking said member and barrel together at either limit of relative rotation, said means comprising a slotted spring-pressed key carried by said member and adapted to enter an opening in said barrel, and a rotatable cap having a depending flange extending into one of the slots of said key for preventing the withdrawal thereof, said flange having an opening for permitting withdrawal of the key when the cap is rotated into proper position.

7. The combination with the steering wheel and post of a motor vehicle, of a core secured on said post for rotation therewith, a barrel secured to said wheel and encircling said core for rotation relatively thereto, means carried by said barrel for engaging said core thereby to permit rotation of the barrel and core together, a member mounted on said barrel for rotation relatively thereto, means carried by said member for operating said core engaging means during its rotation relative to the barrel, means for limiting the rotation of said member relative to said barrel, means for locking said member and barrel together at either limit of relative rotation, said means comprising a slotted spring-pressed key carried by said member and adapted to enter an opening in said barrel, a rotatable cap having a depending flange extending into one of the slots of said key for preventing the withdrawal thereof, and means for retaining said cap in rotary engagement with said barrel.

8. The combination with the steering wheel and post of a motor vehicle, of a core secured on said post for rotation therewith, a barrel secured to said wheel and encircling said core for rotation relatively thereto, means carried by said barrel for engaging said core thereby to permit rotation of the barrel and core together, a member mounted on said barrel for rotation relatively thereto, means carried by said member for operating said core engaging means during its rotation relative to the barrel, means for limiting the rotation of said member relative to said barrel, means for locking said member and barrel together at either limit of relative rotation, said means comprising a slotted spring-pressed key carried by said member and adapted to enter an opening in said barrel, a rotatable cap having a depending flange extending into one of the slots of said key for preventing the withdrawal thereof, and a locking ring rotatable with said cap and adapted to engage another slot in said key.

9. The combination with the steering wheel and post of a motor vehicle, of a core secured on said post for rotation therewith, a barrel secured to said wheel and encircling said core for rotation relatively thereto, means carried by said barrel for engaging said core thereby to permit rotation of the barrel and core together, a member mounted on said barrel for rotation relatively thereto, means carried by said member for operating said core engaging means during its rotation relative to the barrel, means for limiting the rotation of said member relative to said barrel, means for locking said member and barrel together at either limit of relative rotation, said means comprising a slotted spring-pressed key carried by said member and adapted to enter an opening in said barrel, a rotatable cap having a depending flange extending into one of the slots of said key for preventing the withdrawal thereof, and a locking ring rotatable with said cap and adapted to engage another slot in said key, said flange and ring each having an opening for permitting withdrawal of the key when the cap is rotated into proper position.

10. The combination with the steering wheel and post of a motor vehicle, of a core secured on said post for rotation therewith, a barrel secured to said wheel and encircling said core for rotation relatively thereto, means carried by said barrel for engaging said core thereby to permit rotation of the barrel and core together, a member mounted on said barrel for rotation relatively thereto, cams carried by said member for operating said core engaging means during its rotation relative to the barrel, means for locking said cam-carrying member and barrel together, and means for indicating the unlocking position of said locking means.

11. The combination with the steering wheel and post of a motor vehicle, of a core secured on said post for rotation therewith, a barrel secured to said wheel and encircling said core for rotation relatively thereto, means carried by said barrel for engaging said core thereby to permit rotation of the barrel and core together, a member mounted on said barrel for rotation relatively thereto, cams carried by said member for operating said core engaging means during its rotation relative to the barrel, means for limiting the rotation of said member relative to said barrel, means for locking said member and barrel together at either limit of relative rotation, said means comprising a slotted spring-pressed key carried by said member and adapted to enter an opening in said barrel, and a rotatable cap having a depending flange extending into one of the slots of said key for preventing the withdrawal thereof, said flange having an opening for permitting withdrawal of the key when the cap is rotated into proper position, and registering indicia carried by said cam-carrying member and cap for indicating the unlocking position of said flange.

12. The combination with the steering wheel and post of a motor vehicle, of a core secured on said post for rotation therewith, a barrel secured to said wheel and encircling said core for rotation relatively thereto, means carried by said barrel for engaging said core thereby to permit rotation of the barrel and core together, a member mounted on said barrel for rotation relatively thereto, means carried by said member for operating said core engaging means during its rotation relative to the barrel, means for limiting the rotation of said member relative to said barrel, means for locking said member and barrel together at either limit of relative rotation, said means comprising a slotted spring-pressed key carried by said member and adapted to enter an opening in said barrel, a rotatable cap having a depending flange extending into one of the slots of said key for preventing the withdrawal thereof, said cap being provided with an annular groove and a stop in said groove, and a locking ring between said barrel and flange and having a pin projecting into said groove and adapted to be engaged by said stop thereby to rotate said ring with said cap, said ring engaging another slot in said key.

13. The combination with the steering wheel and post of a motor vehicle, of a core secured on said post for rotation therewith, a barrel secured to said wheel and encircling said core for rotation relatively thereto, means carried by said barrel for engaging said core thereby to permit rotation of the barrel and core together, a member mounted on said barrel for rotation relatively thereto, means carried by said member for operating said core engaging means during its rotation relative to the barrel, means for limiting the rotation of said member relative to said barrel, means for locking said member and barrel together at either limit of relative rotation, said means comprising a slotted spring-pressed key carried by said member and adapted to enter an opening in said barrel, a rotatable cap having a depending flange extending into one of the slots of said key for preventing the withdrawal thereof, said cap being provided with an annular groove and a stop in said groove, and a locking ring between said barrel and flange and having a pin projecting into said groove and adapted to be engaged by said stop thereby to rotate said ring with said cap, said ring engaging another slot in said key, said flange and ring each having an opening for permitting withdrawal of the key when the cap is rotated into proper position, and registering indicia carried by two of said rotatable members for indicating the unlocking position of said flange and ring.

In testimony whereof I have signed my name to this specification in the presence of two subscribing witnesses.

ROBERT ARCHIBALD PYKE.

Witnesses:
    LESLIE LAWTON BEAR,
    JESSIE STUART.